H. NELSON.
Enameled Screw-Propeller.

No. 216,880. Patented June 24, 1879.

WITNESSES:
Chas. Niota
C. Sedgwick

INVENTOR:
H. Nelson
BY Munn & Co.
ATTORNEYS.

UNITED STATES PATENT OFFICE.

HORATIO NELSON, OF NEW YORK, N. Y.

IMPROVEMENT IN ENAMELED SCREW-PROPELLERS.

Specification forming part of Letters Patent No. 216,880, dated June 24, 1879; application filed May 6, 1879.

*To all whom it may concern:*

Be it known that I, HORATIO NELSON, of the city, county, and State of New York, have invented a new and useful Improvement in Enameled Screw-Propellers, of which the following is a specification.

The surfaces of iron and steel propeller wheels or screws are corroded, and thereby roughened and honey-combed, by the rapidly-oxidizing influence of the water and the galvanic action arising from the conjunction of different metals (copper, iron, brass, &c.) in the water. Other sources of corrosion are the gases, acids, &c., discharged into the waters of docks or harbors from street-sewers, gas-houses, drain and waste pipes of soap-works, and factories using chemicals in the process of manufacture.

The corrosion of the wheel or screw from these and other allied causes occasions a heavy outlay by the owners of vessels for the replacement of the blades of the wheel, or of the whole wheel, (as the case may be,) when they have become so deeply indented or honey-combed as to be no longer serviceable.

Another serious difficulty arises from the impediment to the speed of the vessel by the friction of the wheel with the water when it has become deeply corroded. To remedy the defect I provide such wheels or screws with a coating of vitreous enamel.

Figure 1:
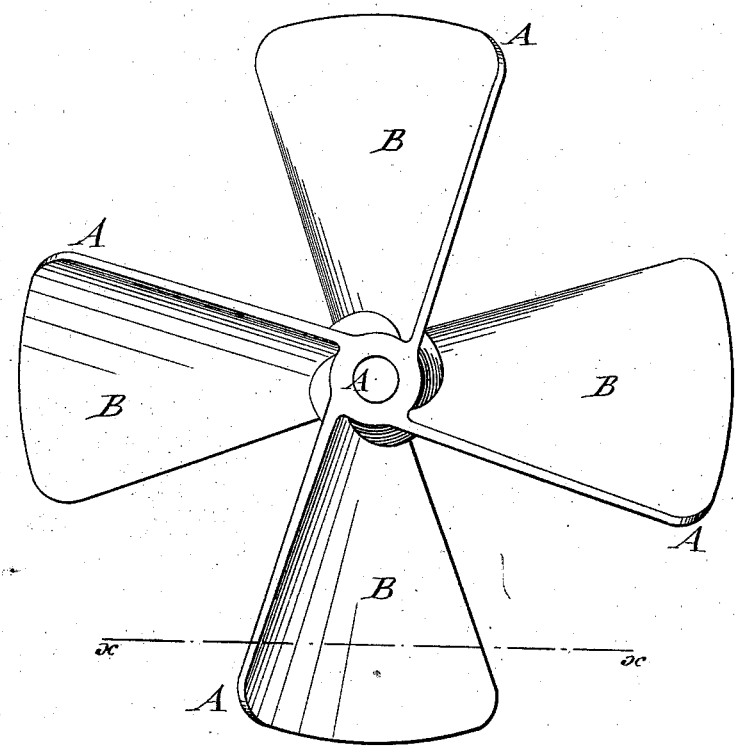
Figure 2:
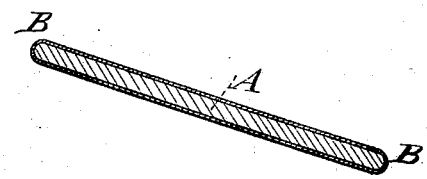

Referring to the drawings, Figure 1 is a front view of a propeller wheel or screw to which my improvement has been applied. Fig. 2 is a cross-section of one of the blades, taken through the line, $x\ x$ Fig. 1.

A indicates a propeller wheel or screw of the usual form, and B a coat of vitreous enamel, which covers its entire surface.

The enameled surface is preferably formed as follows: I take one hundred pounds of glass, twenty pounds borax, and sixteen pounds of soda-crystals, calcined, mixed, and ground to powder. This powder is moistened with water sufficient to form a semi-liquid mass or compound, which is applied directly to the surface of the wheel or screw, by means of a brush, in the same manner as paint is usually applied to various surfaces or objects. The wheel or screw thus thinly coated with the vitrifying composition is next placed in a furnace-oven, and subjected to a degree of heat sufficient to thoroughly melt or flux the vitreous substances and cause them to fill the pores of the metal, thus forming a smooth or glazed surface.

The wheel or screw is then removed from the oven and allowed to cool gradually to prepare it for reception of the enamel proper, which consists of the following ingredients, to wit: one hundred pounds of flint, fifty pounds of borax, and three pounds of bone-dust. These are calcined, ground, and mixed together. Then forty pounds of such mixture and five pounds of potters' clay are mixed, and the mass moistened with enough alcohol to form a thin paste, which latter is applied by means of a brush, so as to form a thin coat on the already-vitrified surface of the wheel or screw. The latter is next placed in an oven and baked until the enameling substance or exterior coating has become sufficiently or properly fluxed, which is determined by observation.

The durability of the wheel or screw thus protected by enamel is indefinitely increased, since no corrosion can occur by reason of galvanic action or other analogous cause, and the friction of the blades with the water is reduced about sixteen per cent., thereby increasing the speed of the vessel correspondingly. My invention is hence of great practical utility and value.

The invention renders iron and steel wheels or screws even more durable than those made of brass, which are so much more expensive.

I am of course aware that the interior surface of iron culinary vessels has been enameled, and that propeller wheels or screws have been painted, in common with the other portions of a vessel, as a finish, and to prevent oxidation before being applied to vessels.

Having thus described my invention, I claim as new and desire to secure by Letters Patent—

As a new article of manufacture, a propeller-screw, A, coated with vitreous enamel B, substantially as herein shown and described.

HORATIO NELSON.

Witnesses:
JAMES T. GRAHAM,
C. SEDGWICK.